United States Patent
Mascola (10) Patent No.: US 10,843,514 B2
(45) Date of Patent: Nov. 24, 2020

(54) HITCH PLATE ASSEMBLY

(71) Applicant: CUSTOM TRUCK & EQUIPMENT LLC, Kansas City, MO (US)

(72) Inventor: James V. Mascola, Olathe, KS (US)

(73) Assignee: CUSTOM TRUCK & EQUIPMENT LLC, Kansas City, MO (US)

( * ) Notice: Subject to any disclaimer, the term of this patent is extended or adjusted under 35 U.S.C. 154(b) by 369 days.

(21) Appl. No.: 15/908,951

(22) Filed: Mar. 1, 2018

(65) Prior Publication Data
US 2019/0270353 A1    Sep. 5, 2019

(51) Int. Cl.
| B60D 1/48 | (2006.01) |
| B60D 1/04 | (2006.01) |
| B60P 1/04 | (2006.01) |
| B62D 21/03 | (2006.01) |

(52) U.S. Cl.
CPC .............. B60D 1/485 (2013.01); B60D 1/04 (2013.01); *B60Y 2200/142* (2013.01)

(58) Field of Classification Search
CPC ... B60P 1/04; B60P 1/28; B60D 1/485; B60D 1/488; B60D 1/48; B60D 1/07; B62D 21/03
USPC ........ 280/495, 504, 800; 298/17 R; 239/657; 165/73
See application file for complete search history.

(56) References Cited

U.S. PATENT DOCUMENTS

| | | | |
|---|---|---|---|
| 1,612,735 A * | 12/1926 | Kyle | E05D 3/02 |
| | | | 16/387 |
| 3,578,358 A * | 5/1971 | Reynolds | B60D 1/01 |
| | | | 280/500 |
| 4,056,283 A | 11/1977 | Pow | |
| 4,273,369 A | 6/1981 | Rosenbaum | |
| 4,645,227 A * | 2/1987 | Callahan | B60D 1/56 |
| | | | 280/495 |
| 5,620,218 A | 4/1997 | Saltzman et al. | |
| 6,234,512 B1 * | 5/2001 | Bettenhausen | B60D 1/485 |
| | | | 280/491.1 |
| 7,040,645 B1 | 5/2006 | Borneman et al. | |
| 7,527,309 B2 | 5/2009 | Smidler | |
| 7,914,083 B2 * | 3/2011 | Thiemke | B60P 1/283 |
| | | | 298/17 B |
| 8,430,419 B2 | 4/2013 | Garth | |

(Continued)

FOREIGN PATENT DOCUMENTS

CN    205601527 U    9/2016
CN    206013531 U    3/2017

(Continued)

*Primary Examiner* — Anne Marie M Boehler
(74) *Attorney, Agent, or Firm* — Lathrop GPM, LLP (57) ABSTRACT

A hitch plate assembly for a truck. The hitch plate includes a lower frame spanning beneath a pair of frame rails of the truck. The lower frame is fabricated from a front plate and end plates at oppositely disposed ends of the front plate. The end plates extend upwardly for attachment directly to the frame rails. An upper frame is mounted over the lower frame and between the frame rails. The upper frame is comprised of a front plate, two side plates, an upper plate and two pairs of spaced apart pivot plates with through holes therein secured to the upper plate, wherein a dump body hinge is received into the space between each pair of pivot plates and each hinge is secured in position by a pin, the dump body being rotatable about each pin.

8 Claims, 6 Drawing Sheets

(56) References Cited

U.S. PATENT DOCUMENTS

| | | | |
|---|---|---|---|
| 9,096,104 B1 | 8/2015 | Jaynes | |
| 2003/0222427 A1* | 12/2003 | Wolters | B60D 1/54 |
| | | | 280/495 |
| 2011/0001303 A1* | 1/2011 | Brewer | B60D 1/485 |
| | | | 280/495 |
| 2011/0198826 A1* | 8/2011 | Weber | B60D 1/18 |
| | | | 280/480 |
| 2011/0204201 A1* | 8/2011 | Kodama | B62J 1/08 |
| | | | 248/406.1 |
| 2016/0311281 A1* | 10/2016 | Mantovani | B60D 1/065 |
| 2017/0341477 A1 | 11/2017 | Reynolds et al. | |

FOREIGN PATENT DOCUMENTS

| | | | | |
|---|---|---|---|---|
| EP | 2495115 A1 * | 9/2012 | | B62D 21/02 |
| EP | 2219934 B1 | 11/2013 | | |
| EP | 2596966 B1 | 2/2016 | | |

\* cited by examiner

HITCH PLATE ASSEMBLY

TECHNICAL FIELD

The present disclosure relates to a hitch plate assembly using mechanical fasteners for attachment to the frame rails of a truck.

BACKGROUND

Dump body trucks, commonly referred to as dump trucks, are the workhorse of heavy construction activities across the world. Utilization of dump body trucks is essential for delivery of earthen materials including stone, asphalt and gravel to name just a few materials. Often times dump body trucks are tasked with not only carrying and dumping materials from their dump bodies but also with pulling trailers thereby significantly enhancing their utility. Dump body trucks are often used to pull trailers that carry, for example, earthmoving equipment, a fuel tank, a potable water tank and construction supplies just to name a few.

In order to couple a trailer to a dump body truck the truck must be equipped with a hitch plate. The hitch plate in nearly all applications is welded to the frame rails of the truck and a pintle hook secured to the hitch plate is used to connect to a trailer. Truck manufacturer's uniformly recommend that the frame rails of a truck not be subjected to welding as the high temperature of the welding process can degrade the steel increasing the potential for metal fatigue and fracture of the frame rails. Nonetheless, nearly all hitch plates in use today on dump body trucks are welded to the frame rails.

The process of welding the hitch plate to the frame rails also removes primer and paint in proximity to the welds thereby subjecting the unpainted metal to accelerated corrosion if left unprotected. To guard against corrosion, following the welding of the hitch plate, the exposed welds and adjacent metal of the frame rails and the hitch plate must be prepared for painting. The exposed metal surface must first be properly prepared for the application of the primer and that is typically performed by sand blasting. Following the sand blasting process a thorough cleaning of the surfaces to remove any residual dust, debris and petroleum based materials such as oils and grease must be performed. After the metal surfaces are sand blasted and cleaned, the metal surfaces are ready for the application of a primer. Once the primer is applied and allowed to dry the cover coat of paint is applied and generally multiple cover coats are applied. A well bonded, thick, impact resistant primer and one or more cover coats are essential to protect metal surfaces that are exposed to impacts from road debris, precipitation and corrosive road salts. The entire process of welding the hitch plate to the frame rails and preparing the exposed metal surfaces with protective coatings requires considerable time and expense.

SUMMARY

Hitch plates are essential for many trucks to be able to safely pull a trailer. The hitch plate provides extremely rigid attachment to the frame rails of the truck and also serve as a mounting location for a pintle hook, D-rings to which safety chains are attached and they also provide a platform from which to mount quick disconnect pneumatic lines to power the air brakes on a towed trailer.

The hitch plate assembly disclosed herein does not rely upon welding to the frame rails of a truck. Eliminating the need to weld to the frame rails also eliminates the need to sand blast the areas proximate the welds, to clean and degrease the weld region, to prime the weld area and to apply one or more cover coats. All of the aforementioned steps require time, and money to accomplish. Additionally, welding of the hitch plate to the frame rails runs counter to the recommendation of truck manufacturers because welding exposes the frame rails to high temperatures which can alter the mechanical properties of the metal potentially leading to accelerated fatigue failure.

The hitch plate assembly disclosed herein relies upon lower and upper frames secured to the frame rails of the truck with threaded fasteners passing through holes drilled in the frame rails. The disclosed hitch plate design utilizes a lower frame that spans beneath the frame rails. The lower frame includes a front plate and end plates at oppositely disposed ends of the front plate. The end plates extend upwardly for attachment to the frame rails with a plurality of mechanical fasteners passing through the end plates securing the end plates to the frame rails. The disclosed hitch plate assembly further includes an upper frame mounted over the lower frame and between the frame rails. The upper frame includes a front plate, two side plates, an upper plate and two pairs of spaced apart pivot plates with through holes. A dump body hinge is received into the space between each pair of pivot plates and each hinge is secured in position by a pin passing through the pivot plates and each hinge. The dump body is rotatable about each pin and the upper frame is secured in position with mechanical fasteners.

It is an object of the disclosed hitch plate assembly to eliminate the need to weld any portion of the hitch plate assembly to the frame rails and to rely upon mechanical attachment of the various components directly to the frame rails.

It is a further object of the disclosed hitch plate assembly to eliminate any need for preparing the metal surfaces of the frame rails or the hitch plate after installation by sand blasting weld areas.

If is a further object of the disclosed hitch plate assembly to eliminate any need for cleaning, priming or painting any of the metal surfaces of the frame rails or the hitch plate after installation.

Various objects, features, aspects and advantages of the inventive subject matter will become more apparent from the following detailed description of preferred embodiments, along with the accompanying drawings in which like numerals represent like components. The contents of this summary section are provided only as a simplified introduction to the disclosure, and are not intended to be used to limit the scope of the appended claims. The contents of this summary section are provided only as a simplified introduction to the disclosure, and are not intended to be used to limit the scope of the appended claims.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

Figure 1:
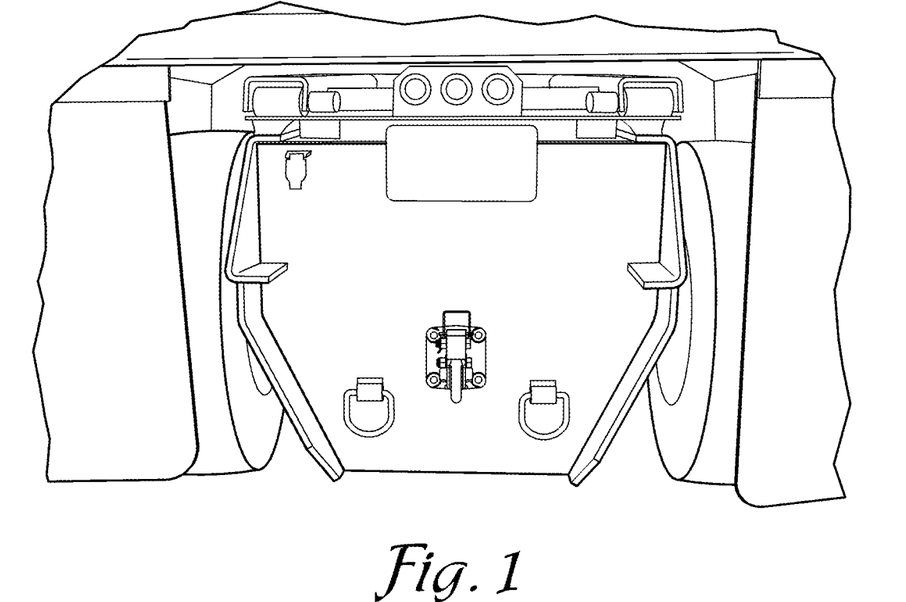
FIG. 1 is a perspective view of a prior art embodiment of a hitch plate assembly secured by welding to the frame rails of a truck.
Figure 2:
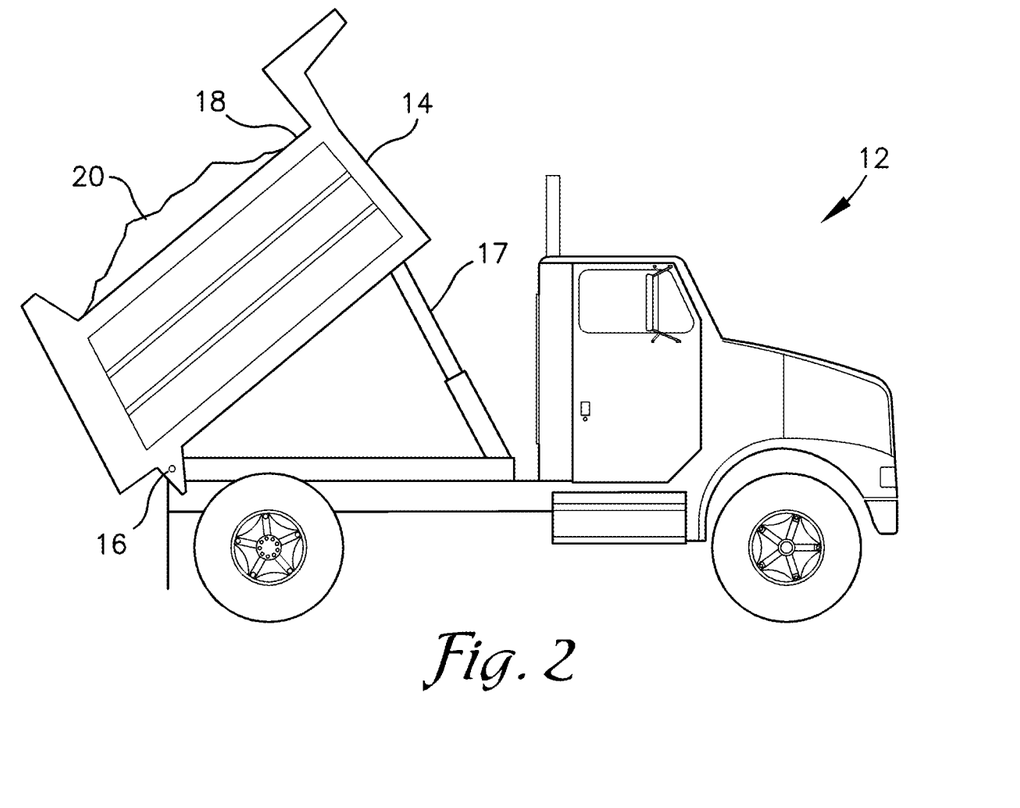
FIG. 2 is a side elevation view of a dump body truck.
Figure 3:
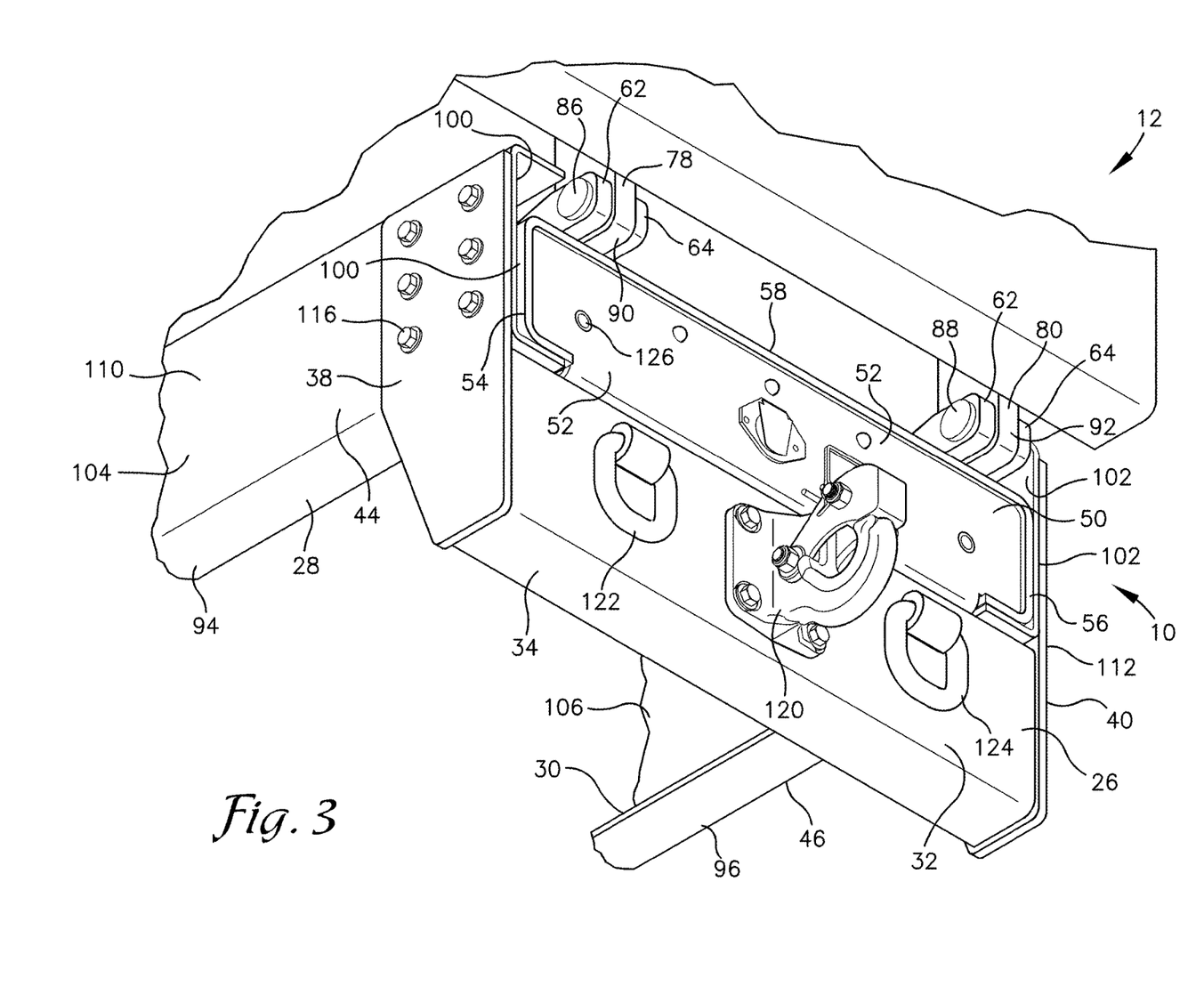
FIG. 3 is a perspective view of an embodiment of the hitch plate assembly.
Figure 4:
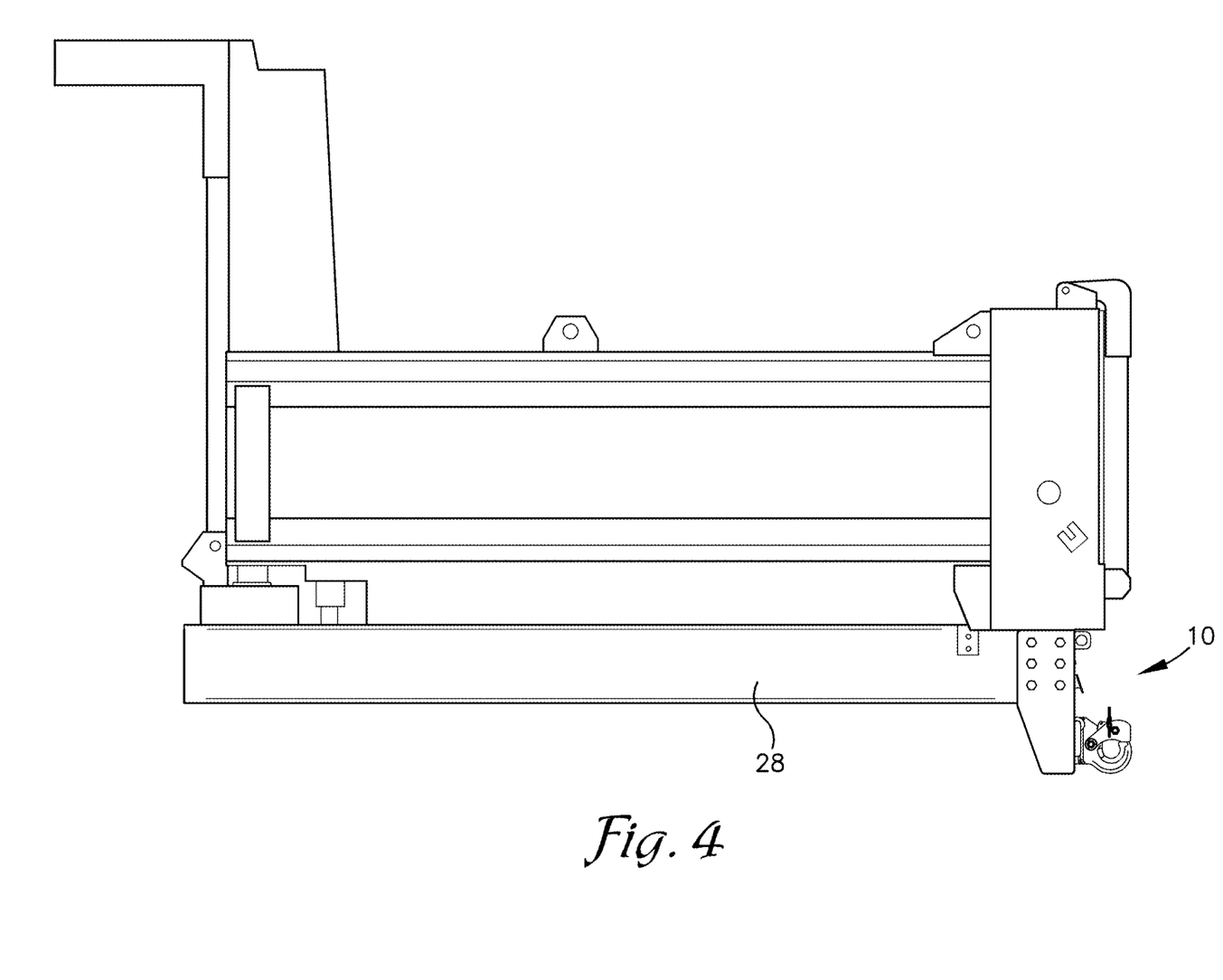
FIG. 4 is a side elevation view of a dump body of a truck showing an embodiment of the hitch plate assembly secured to the frame rails of the truck.

FIG. 1 reveals an embodiment of a prior art hitch plate that is welded directly to the frame rails of a dump body truck. FIG. 2 reveals a typical dump truck 12 equipped with a dump body 14, which is hinged at the rear 16 and equipped with one or more hydraulic rams 17 to lift the front 18, allowing the material 20 in the bed 14 to be deposited ("dumped") on the ground behind the truck at the site of delivery. FIG. 3 reveals a hitch plate assembly 10 secured to the frame rails 28, 30 of a truck 12 as disclosed herein, and FIG. 4 is a side view of the attachment of the hitch plate assembly 10 to the frame rails 28, 30 of the truck 12.

Figure 5:
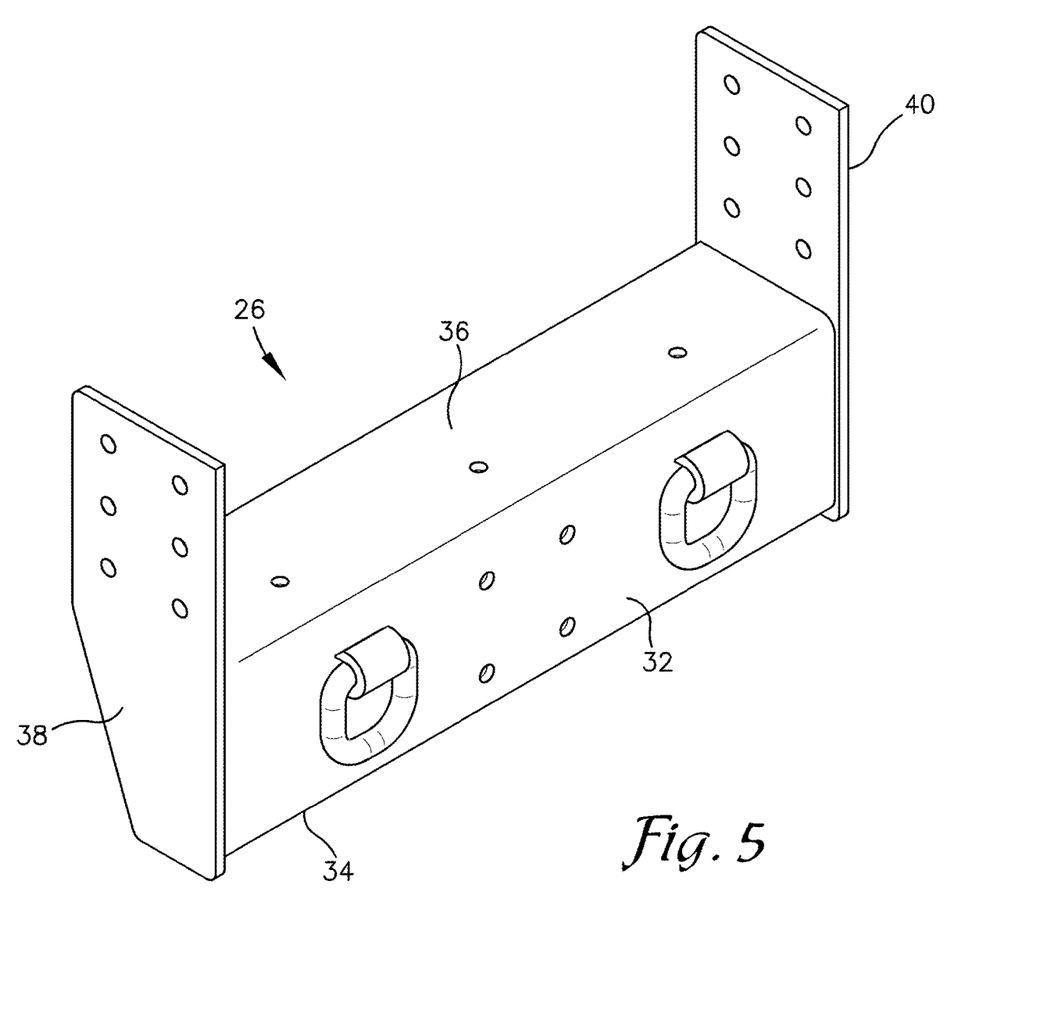
FIG. 5 is a perspective view of the front of an embodiment of the lower frame.

The hitch plate assembly 10 includes a lower frame 26 spanning beneath the frame rails of the truck 12. The lower frame 26, as seen in isolation in FIG. 5, is preferably fabricated from welded flat stock steel with the thickness of the flat stock determined by the anticipated forces applied to the hitch plate assembly 10 during operation, with an appropriate safety factor applied. The lower frame 26 includes a face plate 32, a bottom plate 34, a top plate 36 and end plates 38, 40 at oppositely disposed ends of the front plate 32. The end plates 38, 40 extend upwardly for attachment to the frame rails 28, 30.

Figure 6:
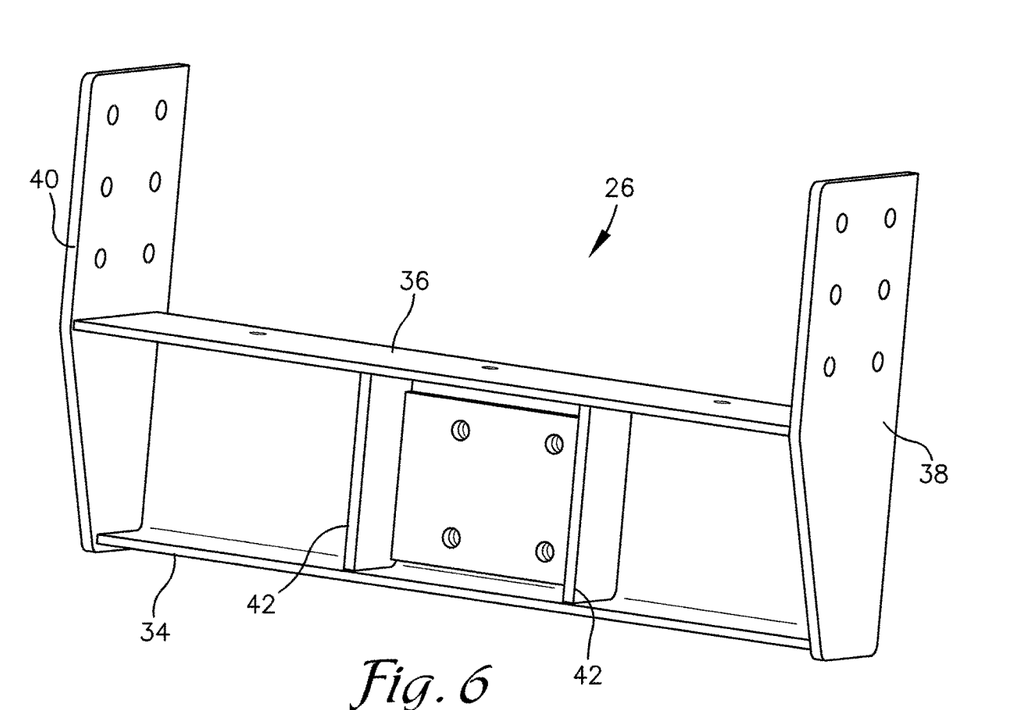
FIG. 6 is a perspective view of the rear of an embodiment of the lower frame.

The lower frame 26, as seen in FIG. 6, also preferably includes one or more stiffeners 42 welded at an edge to the rear surface 46 of the face plate 32 and at an edge to the bottom and top plates 34, 36. The stiffeners 42 serve to prevent twisting and deformation of the hitch plate assembly 10 when exposed to a heavy towing load. As previously detailed, the end plates 38, 40 extend upwardly and overlap the exterior faces 44, 46 of each of the frame rails 28, 30 as best seen in FIG. 3.

Figure 7:
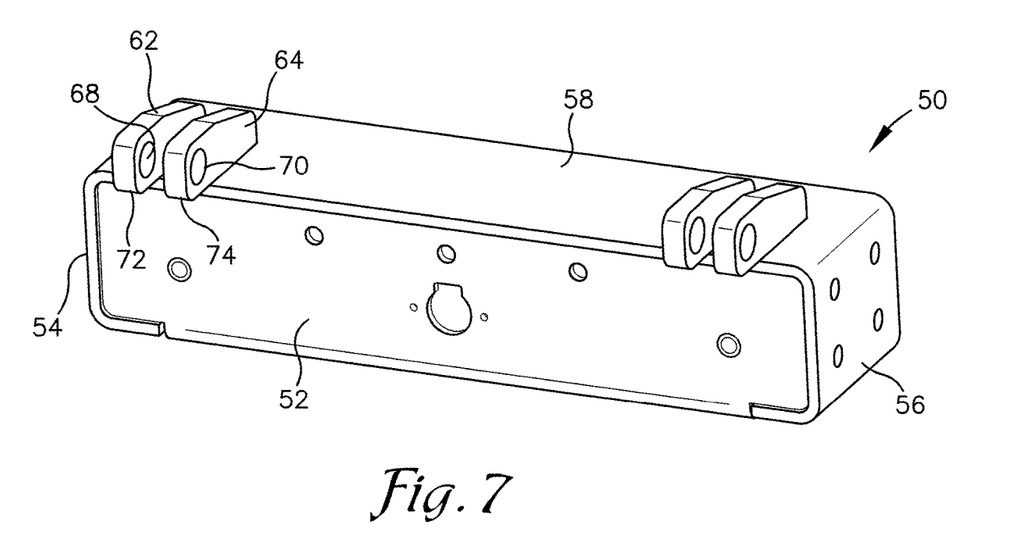
FIG. 7 is a perspective view of the front of an embodiment of the upper frame.

FIGS. 3 and 7 also reveal the existence of an upper frame 50 that is mounted over the lower frame 26 and between the frame rails 28, 30. The upper frame 50 is also preferably fabricated from flat stock steel and includes a front plate 52, two side plates 54, 56 an upper plate 58 and two pairs of spaced apart pivot plates 62, 64 with through holes 68, 70 in each pair of pivot plates. A portion 72, 74 of the pivot plates 62, 64 extend over the front plate 52 of the upper frame 50.

Figure 8:
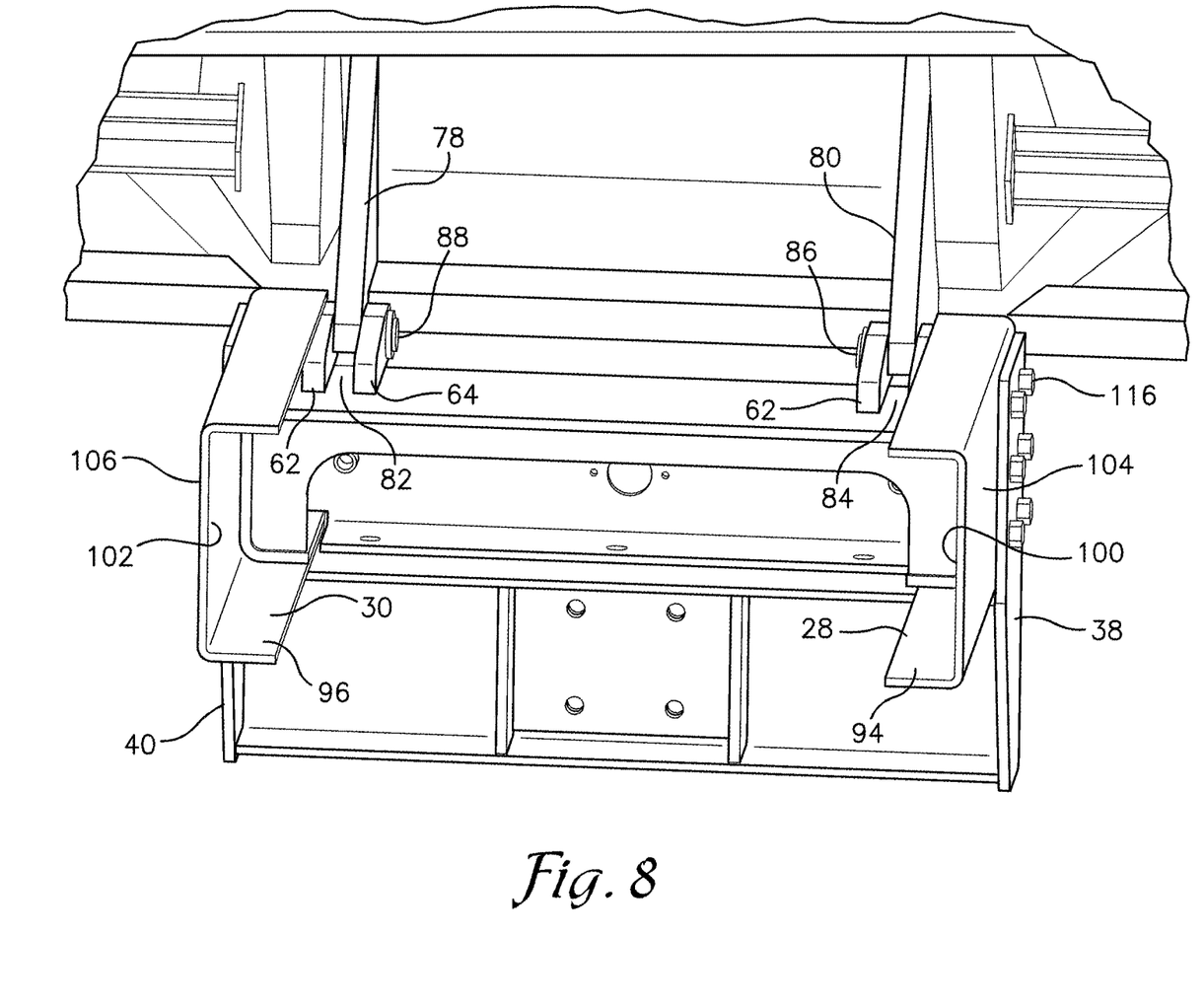
FIG. 8 is a perspective view of the rear of an embodiment of the upper and lower frames mounted to the dump body of the truck.

As seen in FIG. 8, secured to the rear underside 76 of the dump body 14 are dump body hinge plates 78, 80 that are received into the space 82, 84 between each pair of pivot plates 62, 64. Each of the hinge plates 78, 80 are secured in position by pins 86, 88 allowing the dump body 14 to rotate about each pin. As previously detailed, a portion 72, 74 of the pivot plates 62, 64 extends over the front plate 52 of the upper frame 32. The overhang of the pivot plates 62, 64 prevents interference between the hinge plates 78, 80 and the upper plate 58 as the dump body 14 rotates about the hinges. A portion 90, 92 of the hinge plates 78, 80, as seen in FIG. 3, rearward of the pins 86, 88, rotates downwardly when the dump body 14 is elevated, as in a dump mode. Unless a portion 90, 92 of the pivot plates 62, 64, including the area where the pins 86, 88 pass through the holes 68, 70 in the pivot plates is extended away from the plane of the front plate 52, interference of the hinge portion 90, 92 with the upper plate 58 would occur.

As shown in FIG. 3, the upper frame 50 is positioned over the lower frame 26 and the upper frame 50 rests atop the lower flanges 94, 96 of the frame rails 28, 30. The side plates 54, 56 are positioned adjacent the interior surfaces 100, 102 of the vertical portions 104, 106 of the frame rails 28, 30. As previously noted, the lower frame 26 end plates 38, 40 extend upward and are disposed adjacent the exterior surfaces 110, 112 of the frame rails 28, 30. A preferred method of securing the end plates 38, 40 of the lower frame 26 and the side plates 54, 56 of the upper frame 50 to the frame rails 28, 30 is to pass threaded fasteners 116 through a plurality of holes aligned in the end plates, frame rails and the side plates of the upper frame. Locking nuts are then tightened onto the threaded fasteners 116 securing the upper and lower frames to the frame rails 28, 30.

As also shown in FIG. 3, the face plate 32 of the lower frame 26 is preferably configured for mounting of a pintle hook 120. A pintle hook 120 on a tow vehicle 12 works in combination with a lunette ring trailer hitch (not shown). A pintle hook 120 and a lunette ring provide a secure coupling, desirable on rough terrain and these are commonly seen in towing applications by agriculture, industry and the military. A pair of D-rings 122, 124 are also preferably mounted to the face plate 32 of the lower frame 26 and are utilized for attachment of safety chains connected to the trailer that is under tow. Preferably mounted to the upper frame 50 is at least one pneumatic air brake quick connect fitting (not shown). The fitting is mounted into a through hole 126 within the front plate 52 of the upper frame 50.

Having shown and described various embodiments of the present invention, further adaptations of the apparatus described herein may be accomplished by appropriate modifications by one of ordinary skill in the art without departing from the scope of the present invention. Potential modifications will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Moreover, the order of the components detailed in the system may be modified without limiting the scope of the disclosure.

I claim:

1. A hitch plate assembly for a truck, the assembly comprising:

a lower frame spanning between and beneath a pair of frame rails of the truck, the lower frame comprising a front plate with a pintle hitch mounted thereto and at least two holes passing through the front plate, the lower frame further comprising end plates secured at oppositely disposed ends of the front plate, the end plates extending upwardly for attachment with at least two threaded fasteners passing through openings in each end plate, thereby securing each end plate to a separate frame rail, each frame rail having at least two openings therein to receive the at least two threaded fasteners; and an upper frame mounted over the lower frame and between the frame rails, the upper frame further comprising a front plate, two side plates, an upper plate and two pairs of spaced apart pivot plates with through holes therein secured to the upper plate, at least two through holes disposed within the front plate and each side plate, wherein a dump body hinge is received into a space between each pair of pivot plates and each hinge is secured in position by a pin, the dump body rotatable about each pin and the upper frame secured in position with the at least two threaded fasteners that in addition to passing through each lower frame end plate and frame rail also pass through the at least two openings in each of the upper frame side plates.

2. The hitch plate assembly of claim 1, wherein a portion of the pivot plates extend over the front plate of the upper frame.

3. The hitch plate assembly of claim 2, wherein the pivot plate through holes are disposed within the portion of the pivot plates extending over the front plate of the upper frame.

4. The hitch plate assembly of claim 3, wherein the front plate of the lower frame is stiffened by at least one stiffening member secured to a backside of the lower frame front plate.

5. The hitch plate assembly of claim 4, wherein the at least one stiffening member spans laterally across the backside of the lower frame front plate.

6. The hitch plate assembly of claim 5, wherein the frame rails each have an inward facing face and outward facing face.

7. The hitch plate assembly of claim 6, wherein the side plates of the upper frame are disposed adjacent the inward facing face of each of the frame rails.

8. A hitch plate system, the system comprising:

a truck, the truck further comprising first and second frame rails, each frame rail having an inward and an outward facing face and at least one through hole per frame rail;

a lower frame spanning between and beneath the first and second frame rails, the lower frame further comprising a front plate, the front plate comprising at least two through holes, a pintle hitch and a pair of D-rings mounted thereto and end plates at oppositely disposed ends of the front plate, each end plate extending upwardly for attachment to one of the frame rails; and an upper frame mounted over the lower frame and between the frame rails, the upper frame further comprising a front plate, two side plates, an upper plate and two pairs of spaced apart pivot plates with through holes therein secured to the upper plate, at least two through holes disposed within the front plate and a pneumatic air brake fitting is mounted to the front plate, wherein a dump body hinge is received into a space between each pair of pivot plates and each hinge is secured in position by a pin, a dump body rotatable about each pin, at least one fastener passing through the frame rail through holes as well as the through holes in each lower frame end plate securing the hitch plate system in position.

* * * * *